(12) United States Patent
Bergman

(10) Patent No.: US 6,282,023 B1
(45) Date of Patent: Aug. 28, 2001

(54) FRONT PROJECTION IMAGE DISPLAY SCREEN WITH IMPROVED CONTRAST RATIO AND VIEWING ANGLE

(75) Inventor: Anthonie H. Bergman, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/352,099

(22) Filed: Jul. 14, 1999

(30) Foreign Application Priority Data

Jul. 15, 1998 (EP) .................................................. 98202370

(51) Int. Cl.⁷ ................................................. G03B 21/56
(52) U.S. Cl. ................................................................ 359/449
(58) Field of Search ..................................... 359/443, 449, 359/452, 453, 460

(56) References Cited

U.S. PATENT DOCUMENTS

| | | | |
|---|---|---|---|
| 2,652,852 | * | 1/1953 | Van Orden ................................ 88/24 |
| 3,248,165 | * | 4/1966 | Marks et al. ............................ 352/61 |
| 5,193,015 | * | 3/1993 | Shanks ..................................... 359/53 |
| 5,210,641 | * | 5/1993 | Lewis ..................................... 359/448 |
| 6,040,941 | * | 3/2000 | Miwa et al. ........................... 359/443 |
| 6,064,521 | * | 5/2000 | Burke ..................................... 359/443 |
| 6,130,735 | * | 10/2000 | Hatanaka et al. ..................... 349/113 |
| 6,166,793 | * | 12/2000 | Hayashi et al. ....................... 349/113 |

OTHER PUBLICATIONS

M. Honda et al., "A Novel Polymer Film that Controls Light Transmission", Progress in Pacific Polymer Science 3, 1994, pp. 159–169.

Fumitaka Yajima, Seiko Epson Corp., "Reflection Type Screen", Jul. 1987, Abstract.

Edmund Scientific Tech Library, "3M Light Control Film", http://www.edsci.com/industrial/tech–lib/data–curves/3m–lightcontrol.html.

\* cited by examiner

Primary Examiner—Christopher E. Mahoney

(57) ABSTRACT

A front projection image display screen has a front and a rear surface. Viewed from the front surface, the screen includes, in this order, a louvre screen and a reflecting or back-scattering surface. An incident angle-dependent transparent or translucent foil is at the light-incident side of the louvre screen.

10 Claims, 1 Drawing Sheet

FRONT PROJECTION IMAGE DISPLAY SCREEN WITH IMPROVED CONTRAST RATIO AND VIEWING ANGLE

BACKGROUND OF THE INVENTION

The invention relates to a front projection screen having a front side and a rear side and, viewed from the front side, successively comprising a louvre screen and a reflecting or back-scattering screen surface.

A projection screen of the type described in the opening paragraph is known from, for example, the English-language abstract of Japanese patent application JP-A 62-147444.

The projection screen described in this abstract comprises a louvre screen whose blinds are horizontally oriented so that a part of the ambient light incident from above will be absorbed. The ambient light is in fact incident on the screen from all directions. In this way, at least a part of the ambient light is prevented from reaching the viewers' space. However, the signal light comes from a well-defined direction. Provided that the projector is situated at a suitable location, the signal light will be passed unhindered by the louvre screen. The image contrast is thus enhanced by the measure described in said abstract. Furthermore, the known image projection screen has a scattering layer which is provided on the screen surface. Since the layer is present between the screen surface and the louvre screen, the viewing angle of the screen is determined by the louvre screen.

SUMMARY OF THE INVENTION

It is an object of the present invention to provide a projection screen having an even better contrast ratio, also in the presence of ambient light, in combination with a sufficiently large viewing angle.

To this end, a first foil is present at the light-incident side of the louvre screen, which foil has a transparent or scattering effect, dependent on the angle of incidence.

The present invention is based on the recognition that a distinction is to be made between the illumination which is wanted for the screen and the illumination which is unwanted for the screen. Projector light comes from a well-defined direction, namely the direction of the projector, whereas ambient light is incident on the screen from all directions.

The foil used has a discriminating effect on the angle of incidence of the light. Within a given angle range around the normal on the foil, the foil has a light-scattering effect, whereas it is transparent at angles outside this range and does not influence the through-going light.

Such a foil is known per se and is available, for example, under the name of Lumisty of the firm of Sumitomo Chemical Company and is described in the article: "A Novel Polymer Film that Controls Light Transmission" by M. Honda et al. in Progress in Pacific Polymer Science 3, 1994, pp. 159–169.

The foil is available for different angle ranges. A very suitable foil for the application mentioned above is a foil which, when provided on the screen, has an angle range of between, for example −15° and +15° in the horizontal direction, within which range the foil has a scattering effect, whereas it is transparent at angles outside this range. The angle range within which the scattering effect occurs may also be asymmetrical around the normal on the foil.

Moreover, the foil is situated at the light-incident side of the screen so that the ultimate viewing angle for the viewer will correspond to the angle range in which the A foil has a scattering effect.

When ambient light is incident on the foil, the light incident within a given angle with respect to the normal, will be scattered, whereas the rest will be passed without being scattered. At the louvre screen, the ambient light which was scattered by the foil will be passed, whereas the rest, in other words, the light passed unhindered by the foil, will be absorbed. In fact, the louvre screen is also angle-selective. Light at an angle of incidence within a given angle range will be passed, whereas light at an angle of incidence outside this angle range will be obstructed. Subsequently, back-scattering or reflection will take place on the screen surface, dependent on the implementation of this surface.

The screen surface may be implemented, for example, as a reflecting surface. In that case, the ambient light which was scattered by the foil and passed by the louvre screen in the direction of the screen surface will be reflected on the screen surface within the same angles. Consequently, this light will reach the viewers' space via the louvre screen and the foil. The part of the ambient light which is reflected by the screen into the viewers' space thus only relates to the ambient light having an angle of incidence within the angle range in which the foil has a scattering effect.

If the surface has a back-scattering effect, a part of the ambient light will be absorbed by the louvre screen upon return of the light to the exit surface of the screen, because the angle distribution is extended due to the back-scattering.

The angles of incidence of the signal light are within the angle range in which the foil has a scattering effect so that, in the case of a reflecting surface, substantially all the signal light will reach the viewers' space. If the surface is implemented as a back-scattering surface, the signal light which, upon incidence on the screen, has angles of incidence within a given angle range will be scattered through a much larger angle range. Consequently, a part of the signal light will be obstructed by the louvre screen and thus be prevented from reaching the viewers' space. However, since also more ambient light will be obstructed in the case of a back-scattering surface, the contrast ratio of the projected image is substantially not influenced detrimentally.

A preferred embodiment of the front projection screen according to the invention is characterized in that a second foil is present between the louvre screen and the screen surface, which second foil has a transparent or scattering effect, dependent on the angle of incidence.

Due to the presence of the second foil, there is extra scattering in the angle range in which scattering already occurs. This has the advantage of a better image homogeneity within the angle range, which is important for the signal light.

A further embodiment of the front projection screen according to the invention is characterized in that a polarizer is present at the light-incident side of the first foil, said polarizer having a transmission direction which corresponds to the direction of polarization of signal light to be projected.

When the projector supplies polarized light and when the transmission direction of the polarizer corresponds to the direction of polarization of the signal light, the signal light will be passed. Substantially half the ambient light will be obstructed. When using a polarizer only, approximately half of the light incident on the screen reaches the viewers' space again. When using a foil and a louvre screen as described above, the ambient light incident on the screen within a given angle of incidence will reach the viewers' space, independent of the direction of polarization. Now, it is proposed to add a polarizer to the combination of one foil or two foils with a louvre screen. As a result, only the ambient light which is incident on the screen within a given angle of incidence and also has the transmission direction of polarization of the screen will reach the viewers' space. The result is an improved contrast ratio.

These and other aspects of the invention will be apparent from and elucidated with reference to the embodiments described hereinafter.

DETAILED DESCRIPTION OF THE PREFERRED EMBODIMENTS

Figure 1:
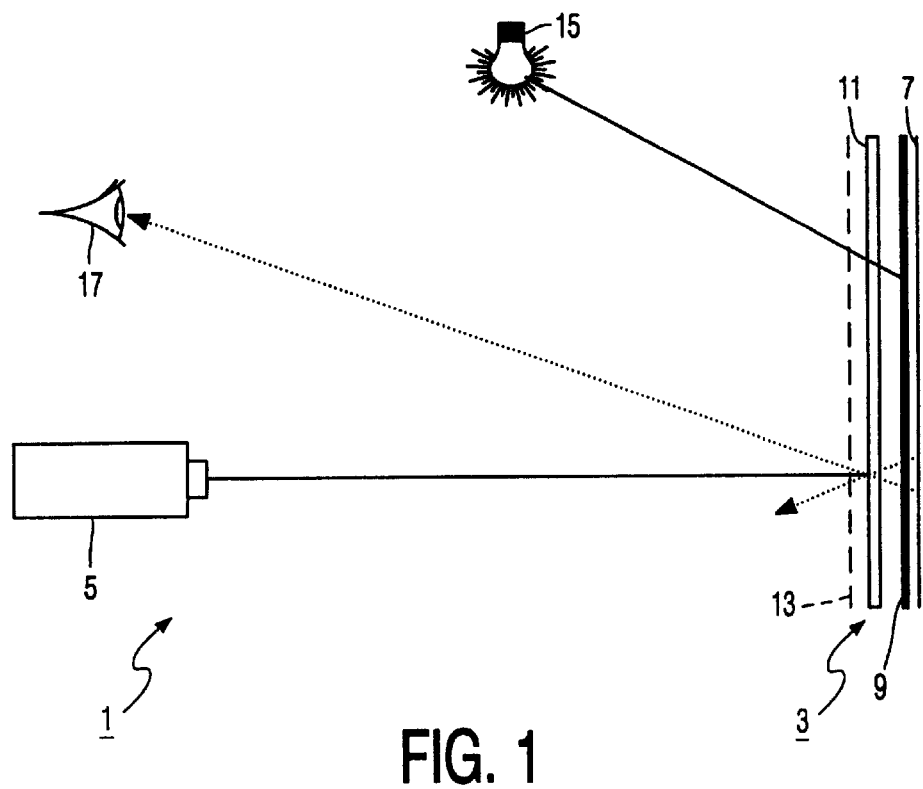
FIG. 1 is a diagrammatic side-elevational view of an image projection system with a first embodiment of a front projection screen according to the invention.

The image projection system 1 shown in FIG. 1 comprises a front projection screen 3 and a projector 5. The front projection screen 3 has a screen surface 7. The screen surface 7 may be implemented in different manners. It may be a low-gain surface as is the case for a white surface. The screen surface may be alternatively a high-gain surface such as a mirror.

A louvre screen 9 is situated at the light-incident side of the screen surface 7. A louvre screen comprises a plurality of parallel blinds which ensure that only light which is incident within a given angle range on the screen is passed, whereas light having angles of incidence outside this angle range will be obstructed. The way in which this angle range is situated with respect to the normal on the louvre screen is determined by the tilt of the blinds. The distance between the blinds defines the magnitude of the angle range in which light is passed, and thus the viewing angle of the screen.

The blinds may be oriented either horizontally or vertically. When the ambient light comes mainly from the side, for example, at daylight coming from windows, it may be advantageous to orient the louvre screen vertically. In the case of artificial lighting, the light comes from the ceiling and it will be advantageous to orient the louvre screen horizontally.

The present invention proposes to provide the image projection screen comprising a louvre screen with a foil 11 at the light-incident side of the louvre screen, which foil has a scattering or transparent effect, dependent on the angle of incidence. Such a foil has a scattering effect within a given angle range, whereas incident light is passed unhindered outside this range. Such foils are known per se and are available, for example, under the name of "Lumisty" of the firm of Sumitomo Chemical Company. The angle range within which the foil has a scattering effect may extend symmetrically or asymmetrically with respect to the normal on the foil.

The Sumitomo foil consists of a plurality of successive thin layers having mutually different refractive indices and being spaced approximately 3 $\mu$m. apart, so that a diffracting structure is formed. Such a foil is extensively described in the article "A Novel Polymer Film that Controls Light Transmission" by M. Honda et al. in Progress in Pacific Polymer Science 3, 1994, pp. 159–169.

The choice of the angle range is determined by the desired application, notably by the angle at which projected images are to be made visible.

The orientation of the blinds of the louvre screen 9 and the scattering direction of the foil 11 are parallel to each other. This means that the layers of the foil are substantially perpendicular to the blinds of the louvre screen. This has the advantage that, when the projector light is scattered in the horizontal direction, in which direction the largest viewing angle is desired, the projector light remains between the blinds of the louvre screen so that it will not be absorbed.

When the blinds are oriented horizontally, the foil thus preferably has a stronger scattering effect in the horizontal direction than in the vertical direction. In the vertical direction, light which is incident on the louvre screen at a too large angle is obstructed and will thus be lost. Moreover, in view of the position of the viewers in a viewers' space, it is generally desired to have a relatively large horizontal viewing angle and a more limited vertical viewing angle for projection screens.

The effect of the incident angle-dependent scattering or transparent foil is also determined by the implementation of the screen surface. When the screen surface has a high gain, such as, for example a mirror, the angle range within which the foil has a scattering effect can be chosen to be relatively small, and the light can leave the screen within a relatively small angle range. In this case, the angle range is thus determined by the foil. This results in a very bright image, be it within a limited viewing angle.

When the screen surface has a low gain, which is the case, for example, when using a white surface, the projector light will be scattered on that surface through a relatively large angle range. A part of the projector light will thus be obstructed by the louvre screen on its way from the surface to the foil. On the other hand, a larger part of the ambient light will also be obstructed so that the ultimate contrast ratio is still better than in known image projection screens.

The use of the foil thus has the greatest effect as regards contrast improvement in the case of a high-gain screen surface, because the foil then determines the angle range.

The use of an angle-dependent scattering or transparent foil has an additional advantage. Both for a low-gain and a high-gain screen surface, Moiré interference may occur between the pitch of the louvre screen and the pitch of the display panel of the projector. Use of a foil may considerably reduce this effect in the image. Moreover, when a high-gain screen surface is used, there is a risk of Moire interference between the louvre screen and its image on the screen surface. Due to the presence of the foil, this effect in the image can also be reduced considerably.

Figure 2:
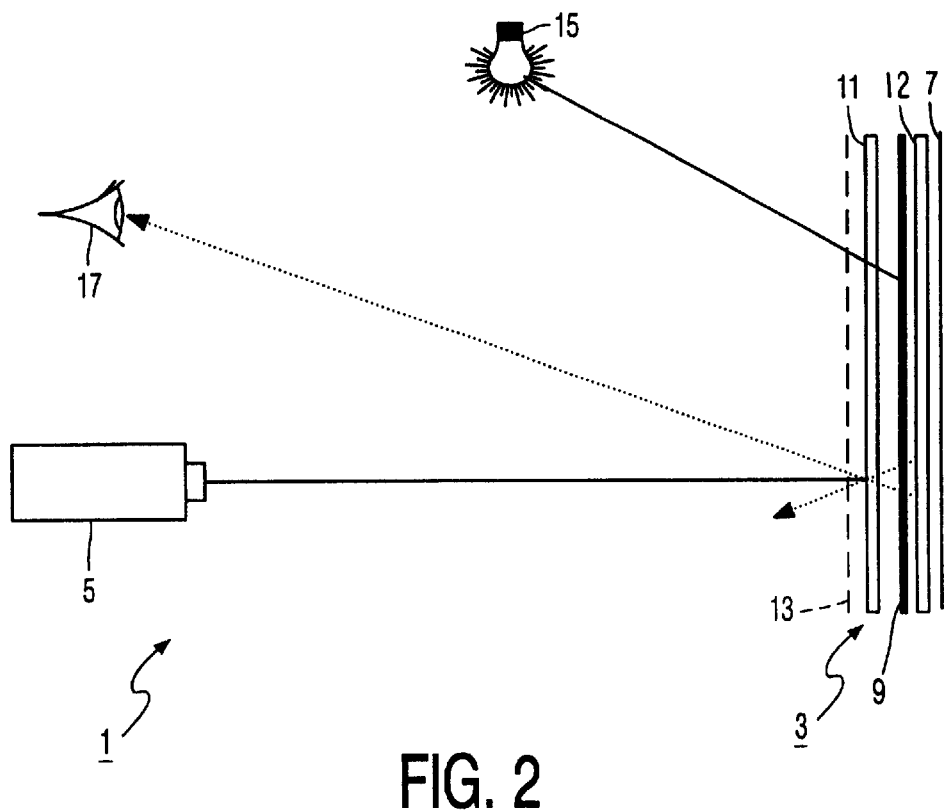
FIG. 2 is a diagrammatic side-elevational view of an image projection system with a second embodiment of a front projection screen according to the invention.

FIG. 2 shows an image projection system with a second embodiment of a projection screen according to the invention. The projection screen comprises a second foil 12 which is situated between the louvre screen 9 and the screen surface 7. This second foil 12 ensures that there is extra scattering within the angle range where scattering occurs already, so that a better image homogeneity is realized.

The foil as mentioned above maintains its direction of polarization, which is in contrast to generally known scattering foils which mostly have a depolarizing effect. Both in the case of one foil and of two foils, it is then advantageous to provide a polarizer 13 at the light-incident side of the assembly. This measure is only sensible if the signal light of the projector is polarized. The transmission direction of polarization of the polarizer 13 should then correspond to the direction of polarization of the signal light. Since the polarizer 13 is an optional element, it is shown in broken line in both Figures. Substantially half the ambient light which is incident on the screen will already be obstructed by the polarizer 13. When a foil 11 and a louvre screen 9 are used, the ambient light incident on the screen within a given angle of incidence will reach the viewers' space, independent of the direction of polarization. By adding a polarizer 13 to the combination of one foil or two foils with a louvre screen, only the ambient light which is incident on the screen within a given angle of incidence and also has the transmission direction of polarization of the screen will reach the viewers' space, which results in an improved contrast ratio. The operation principle of the image projection screen according to the invention will now be elucidated with reference to the drawings.

The ambient light 15 is diagrammatically represented by a lamp and the viewers' space 17 is diagrammatically represented by a human eye.

When ambient light 15 is incident on the foil 11, the part of the ambient light incident within a given angle with respect to the normal will be scattered, whereas the rest will be passed without being scattered. At the louvre screen 9, the ambient light which was scattered by the foil will partly be passed, whereas the rest, in other words, the light passed unhindered by the foil, will be absorbed because it is incident at a relatively large angle. In fact, the louvre screen 9 is also angle-selective. Light at an angle of incidence within a given angle range will be passed, whereas light at an angle of incidence outside this angle range will be obstructed. Subsequently, back-scattering or reflection will take place on the screen surface 7, dependent on the implementation of this surface.

The screen surface 7 may be, for example a reflecting surface such as, for example a mirror. In that case, the ambient light which was scattered by the foil 11 and passed by the louvre screen 9 will be reflected within the same angle range as that of the angles of incidence. Consequently, this light will reach the viewers' space 17 via the louvre screen 9 and the foil 11. Thus, this is the part of the ambient light which is reflected by the screen into the viewers' space. Only the ambient light having an angle of incidence within the angle range in which the foil 11 has a scattering effect will thus reach the viewers' space 17.

If the surface 7 has a back-scattering effect, a part of the ambient light will be absorbed by the louvre screen 9 upon return of the light to the exit surface of the screen, because the angle distribution is extended due to the back-scattering.

If the projector 5 is arranged at a suitable position with respect to the projection screen 3, the angles of incidence of the signal light will be within the angle range in which the foil 11 has a scattering effect. If the surface is a reflecting surface, substantially all the signal light will thus reach the viewers' space. If the surface is a back-scattering surface, the signal light which, upon incidence on the screen, has angles of incidence within a limited angle range, will be scattered on the surface 7 through a much larger angle range.

As a result, a part of the signal light will be obstructed by the louvre screen and thus be prevented from reaching the viewers' space. However, since more ambient light will be obstructed if a back-scattering surface is used, the contrast ratio of the projected image will substantially not be influenced detrimentally.

In a further embodiment it is proposed to provide the projection screen with a polarizer 13. Substantially half the ambient light which is incident on the screen will already be obstructed by the polarizer 13. When a foil 11 and a louvre screen 9 are used, the ambient light incident on the screen within a given angle of incidence will reach the viewers' space, independent on the direction of polarization. By adding a polarizer 13 to the combination of one foil or two foils with a louvre screen, only the ambient light which is incident on the screen within a given angle of incidence and also has the transmission direction of polarization of the screen will reach the viewers' space. Consequently, the contrast ratio is even further improved.

According to the present invention, an image projection screen having a relatively large contrast ratio within a slightly limited, but ample sufficiently large viewing angle is obtained.

What is claimed is:

1. A front projection screen having a front side and a rear side and, viewed from the front side, successively comprising a louvre and a reflecting or back-scattering screen surface, further comprising a first foil at the front side of the louvre wherein said first foil has a transparent or scattering effect, dependent on an angle of incidence.

2. A front projection screen as claimed in claim 1, further comprising a second foil between the louvre and the screen surface, wherein said second foil has a transparent or scattering effect, dependent on the angle of incidence.

3. A front projection screen as claimed in claim 1 further comprising a polarizer at the front side of the first foil, said polarizer having a transmission direction which corresponds to a direction of polarization of a signal light.

4. A screen that receives an incident light from a front side comprising:
   a foil that receives said incident light;
   a louvre located behind said foil; and
   a screen surface located behind said louvre,
   wherein said foil has a transparent effect or a scattering effect on said incident light depending on an angle of incidence of said incident light, and said screen surface selectively reflects or back-scatters a portion of said incident light that reaches said screen surface.

5. The screen of claim 4, further comprising a polarizer located in front of the first foil, said polarizer having a transmission direction which corresponds to a direction of polarization of a signal light.

6. The screen of claim 4, wherein said foil provides a viewing angle that corresponds to an angle in which said foil has said scattering effect.

7. The screen of claim 4, wherein said screen surface reflects a portion of said incident light which was scattered by the foil and passed by the louvre.

8. The screen of claim 4, wherein said louvre passes a portion of the incident light that was scattered by said foil.

9. The screen of claim 4, wherein said screen surface back-scatters a part of ambient light beyond said angle of incidence so that said part is absorbed by the louvre upon exit of the part from the louvre.

10. A screen that receives an incident light from a front side comprising:
    a foil that receives said incident light;
    a louvre located behind said foil; and
    a screen surface located behind said louvre,
    wherein said foil has a transparent effect or a scattering effect on said incident light depending on an angle of incidence of said incident light;
    and further comprising a second foil located between the louvre and the screen surface, wherein said second foil has a transparent or scattering effect depending on said angle of incidence.

* * * * *